United States Patent

Lindblom et al.

[11] Patent Number: 6,017,073
[45] Date of Patent: Jan. 25, 2000

[54] FASTENING ARRANGEMENT

[75] Inventors: Jonny Lindblom; Torbjörn Börjesson, both of Eskilstuna, Sweden

[73] Assignee: Volvo Wheel Loaders AB, Eskilstuna, Sweden

[21] Appl. No.: 09/184,233

[22] Filed: Nov. 2, 1998

[30]    Foreign Application Priority Data

Nov. 4, 1997 [SE] Sweden ................................. 9704027

[51] Int. Cl.[7] .............................. B62D 23/00; B60J 7/00
[52] U.S. Cl. ..................................... 296/35.1; 296/190.07
[58] Field of Search ......................... 296/190.1, 190.07, 296/35.1; 248/577, 635; 267/153, 140.3, 141, 141.1, 141.2, 141.3, 141.4, 141.5, 141.7

[56]    References Cited

U.S. PATENT DOCUMENTS

| | | | |
|---|---|---|---|
| 3,809,427 | 5/1974 | Bennett | 296/35.1 |
| 3,985,385 | 10/1976 | Kennicutt et al. | 296/35.1 |
| 4,014,588 | 3/1977 | Kohriyama | 296/35.1 |
| 4,286,777 | 9/1981 | Brown . | |
| 4,306,708 | 12/1981 | Gassaway et al. | 267/141.3 |
| 4,530,491 | 7/1985 | Backsbee | 267/141 |
| 4,783,039 | 11/1988 | Peteson et al. | 296/35.1 |
| 4,819,980 | 4/1989 | Sakata et al. . | |
| 5,110,081 | 5/1992 | Lang, Jr. | 248/635 |

FOREIGN PATENT DOCUMENTS

| | | |
|---|---|---|
| 0 612 892 | 5/1993 | European Pat. Off. . |
| 40 36 538 | 5/1992 | Germany . |
| 59-19741 | 2/1984 | Japan . |
| 61-180041 | 8/1986 | Japan . |
| 08276753 | 10/1996 | Japan . |
| 513061 | 10/1939 | United Kingdom . |
| 2 062 804 | 5/1981 | United Kingdom . |
| WO 88/09449 | 12/1988 | WIPO . |

*Primary Examiner*—D. Glenn Dayoan
*Assistant Examiner*—Lori L. Coletta
*Attorney, Agent, or Firm*—Young & Thompson

[57]    ABSTRACT

A fastening arrangement for vibration-insulating and impact-damping fastening of a first member to a second member includes a first elastic element which is arranged to bear against the first and the second member and a fixing element arranged in a through-hole in the first and second member and in the first elastic element, the first elastic element being arranged in and essentially contained in the through-hole of the second member.

14 Claims, 5 Drawing Sheets

FASTENING ARRANGEMENT

BACKGROUND OF THE INVENTION

The present invention relates to a fastening arrangement for vibration-insulating and impact-damping fastening of a first member to a second member, which fastening arrangement comprises a first elastic element, which is arranged to bear against the first and the second member, and a fixing element arranged in a through-hole in the first and second member and in the first elastic element.

DESCRIPTION OF THE RELATED ART

In construction machines, such as wheeled loaders and dumpers, use is made of fastening arrangements for fastening the vehicle cab to the vehicle frame, a further function of these arrangements being to reduce the movements transmitted from the frame of the vehicle to the cab. Another function of the fastening arrangement is to damp the relatively great movements and impacts which arise on account of the dead weight of the cab during operation of the vehicle. By damping the movements with great amplitude, good driver comfort is achieved. Vibrations with small amplitudes and high frequency, which also occur during operation of construction machines, are to be prevented from reaching the cab by the fastening arrangements as these vibrations can cause disturbance in the form of noise and vibrations in the cab.

It has become apparent, however, that the known fastening arrangements do not provide adequate insulation of vibrations with small amplitudes and high frequency when they are simultaneously to damp the movements with great amplitude.

SUMMARY OF THE INVENTION

One object of the present invention is to eliminate the abovementioned disadvantages of the known fastening arrangements.

Another object of the present invention is to produce a fastening arrangement that is easy to mount and adjust.

This is achieved by means of a fastening arrangement of the type indicated in the introduction, in which the first elastic element is arranged in and essentially contained in the through-hole of the second member.

Such a fastening arrangement creates a good environment in the vehicle cab as it allows a satisfactory combination of, on the one hand, vibration insulation of the vibrations with small amplitudes and high frequency and, on the other hand, impact-damping of the movements with relatively great amplitude.

DESCRIPTION OF THE PREFERRED EMBODIMENT

Figure 1:
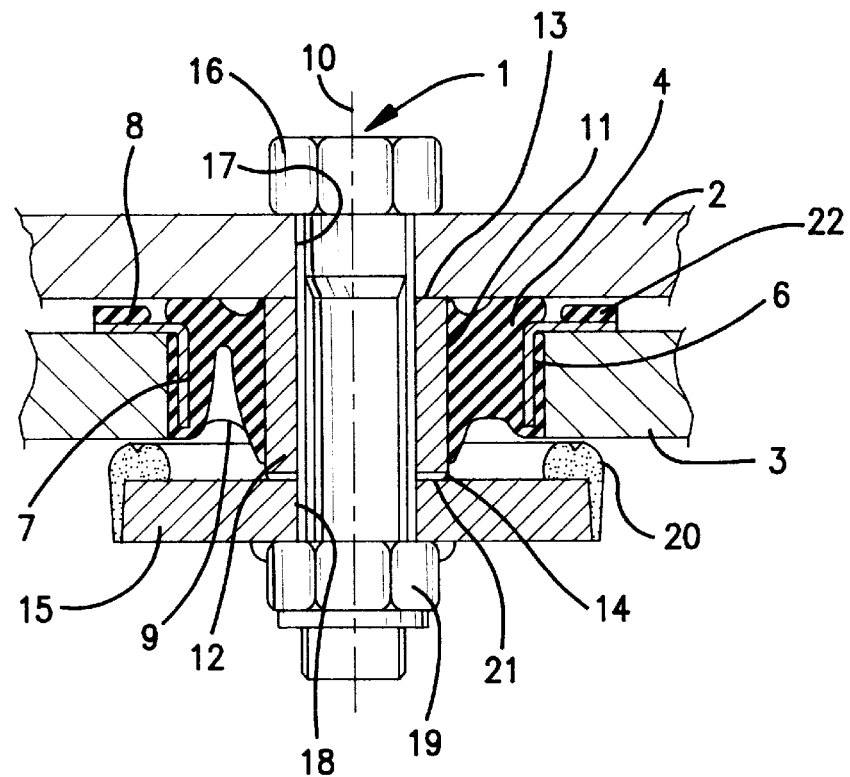
Figure 2:
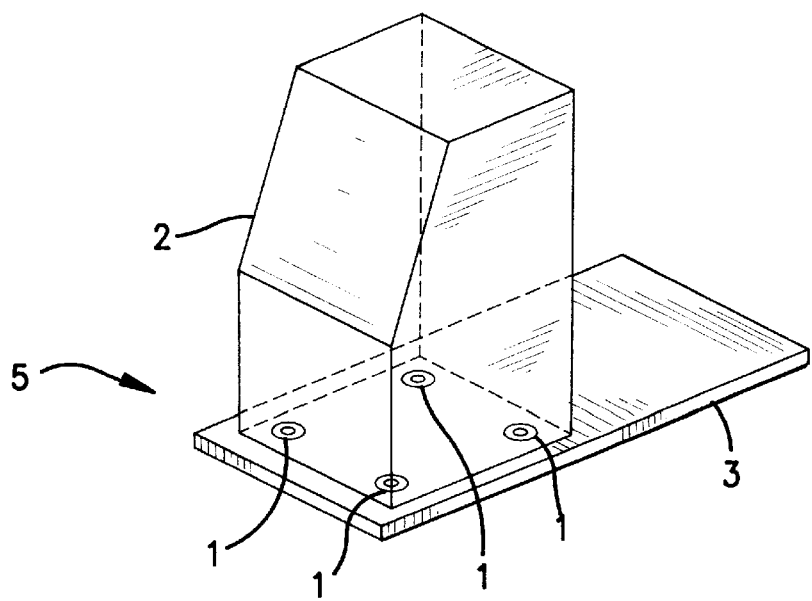
Figure 3:
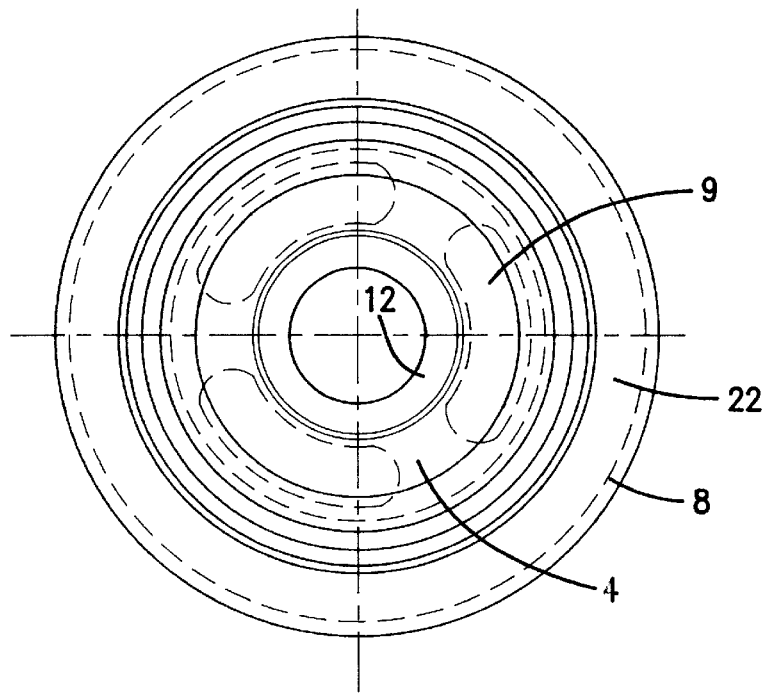
Figure 4:
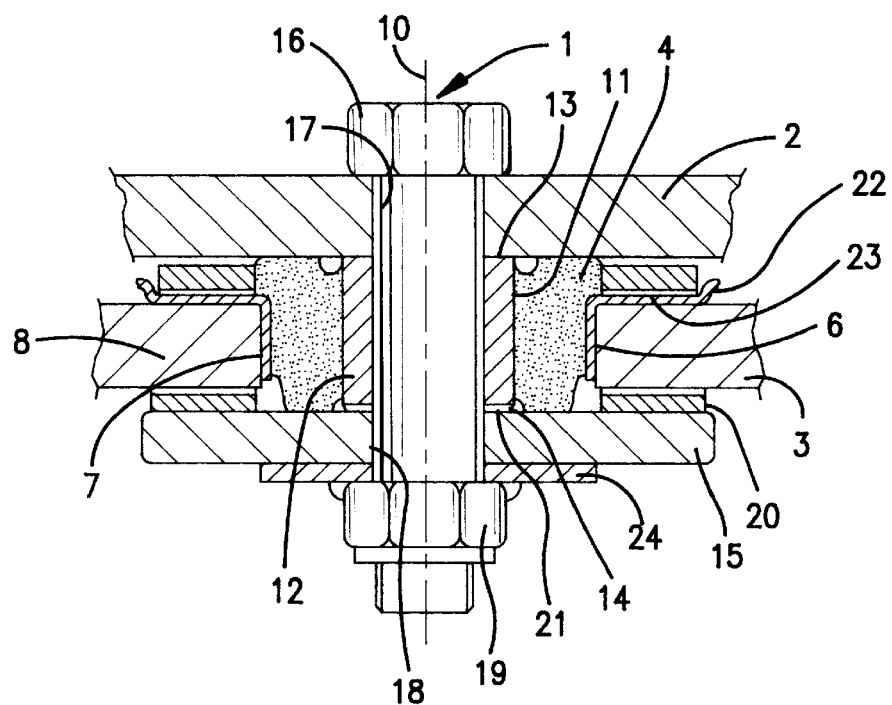
Figure 5:
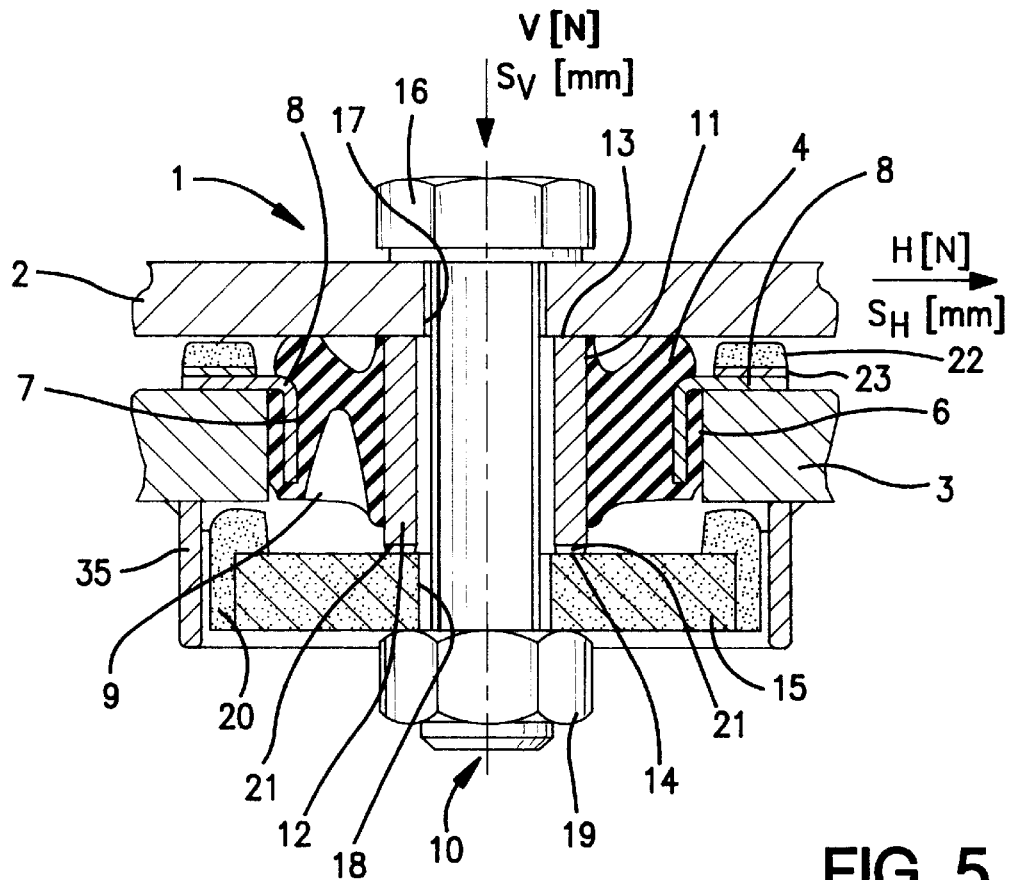
Figure 6:
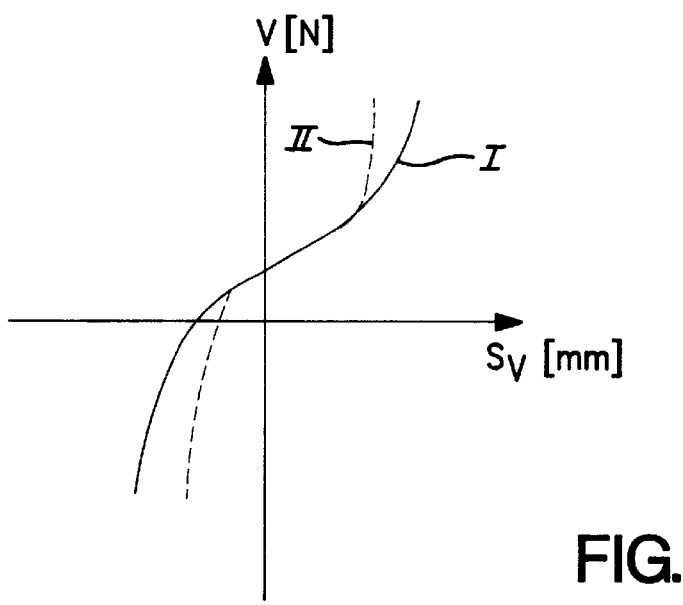
Figure 7:
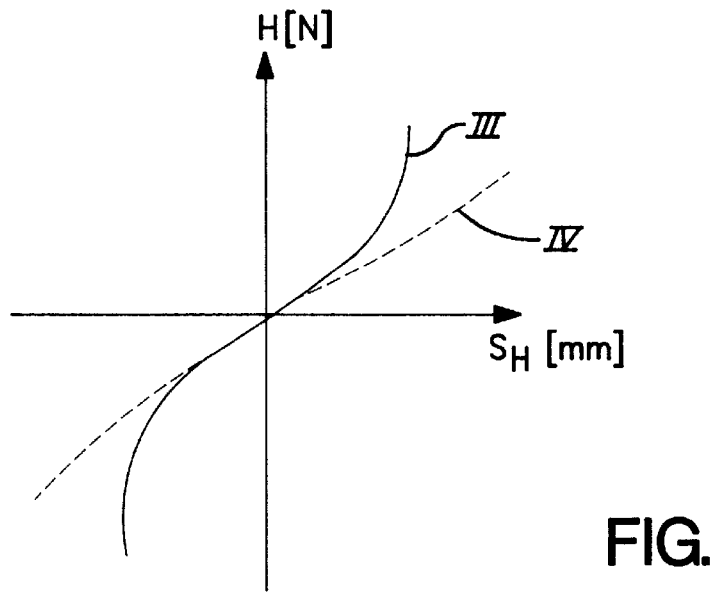
Figure 8:
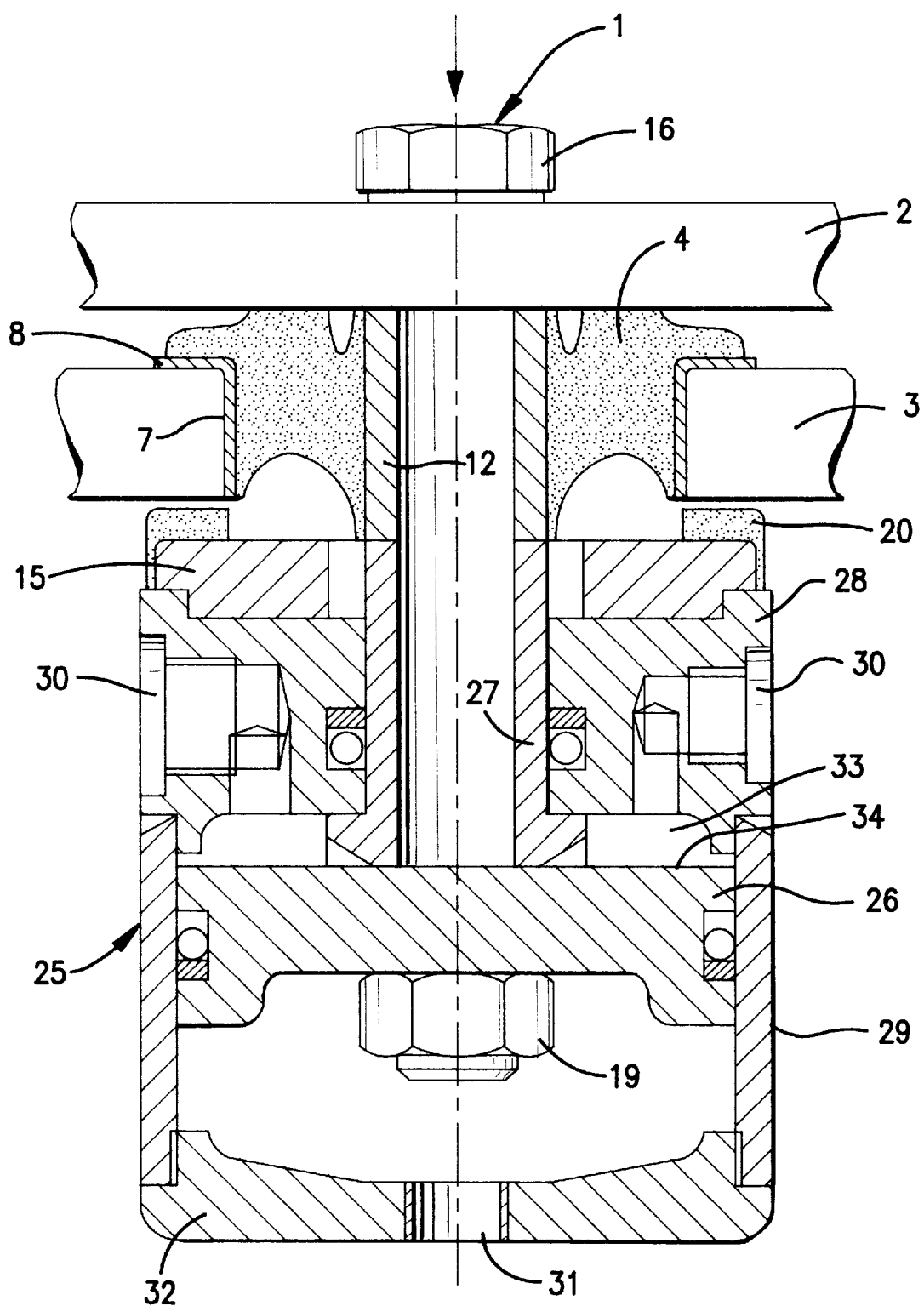

The invention will be described in greater detail below with reference to the appended drawings showing embodiments, in which:

FIG. 1 shows a fastening arrangement according to a first embodiment of the invention, FIG. 2 shows a vehicle cab that is fastened using a number of fastening arrangements according to the invention, FIG. 3 shows a view from above of a first elastic element according to the first embodiment, FIG. 4 shows a fastening arrangement according to a second embodiment, FIG. 5 shows a fastening arrangement according to a third embodiment, FIGS. 6 and 7 show a basic diagram representing the properties of the fastening arrangements according to the first, second and third embodiments, and FIG. 8 shows a fastening arrangement according to a fourth embodiment of the invention.

Figure 9:
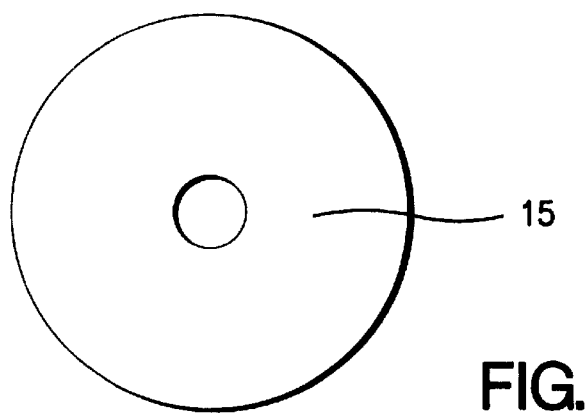
Figure 10:
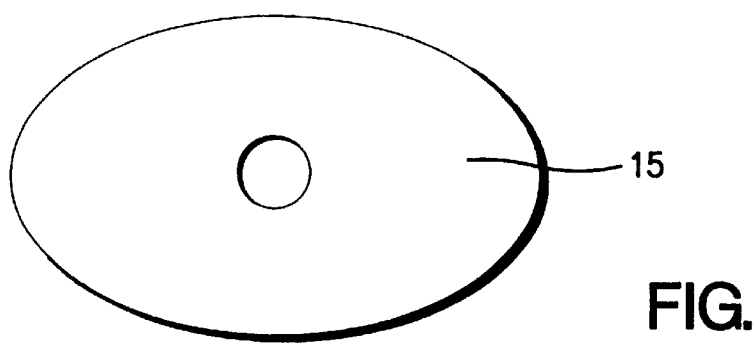

FIGS. 9 and 10 show certain stop washer shapes.

In FIG. 1, a fastening arrangement 1 for vibration-insulating and vibration-damping fastening of a first member 2 to a second member 3 is shown. The first member 2 may comprise a vehicle cab 2 and the second member 3 may comprise a vehicle frame 3, which is shown diagrammatically in FIG. 2. The vehicle cab 2 and the vehicle frame 3 preferably constitute components of a construction machine, such as a wheel loader or a dumper.

The fastening arrangement 1 comprises a first elastic element 4, which preferably consists of rubber, with a material quality that is adapted to insulate and absorb vibrations with small amplitudes and high frequency, which can cause disturbing noise and vibrations in the vehicle cab 2 of a vehicle 5 and in this way create a poor working environment for a person in the vehicle cab 2. The first elastic element 4 is arranged to bear against both the vehicle cab 2 and the vehicle frame 3. The first elastic element 4 is arranged in and essentially contained in a through-hole 6 in the vehicle frame 3.

According to the embodiment in FIG. 1, the first elastic element 4 bears against the vehicle frame 3 via a ring 7 which, by means of, for example, a vulcanizing process, is arranged on an outer periphery of the first elastic element 4. The vehicle cab 2 rests on the first elastic element 4 which thus absorbs the force from the vehicle cab 2. The ring 7 is preferably provided with a flange 8 which is arranged to bear against the vehicle frame 3. The flange 8 and the ring 7 absorb the force from the first elastic element 4. In FIG. 2, the vehicle cab 2 is supported by four fastening arrangements 1 but it is possible that an arbitrary number of fastening arrangements 1 may support the vehicle cab 2.

The first elastic element 4 is provided with three cavities 9 which are distributed evenly around a centre axis 10, which is also shown in a view from above in FIG. 3 of the first elastic element 4.

The first elastic element 4 is provided with a through-hole 11, in which a distance sleeve 12 is arranged. The distance sleeve 12 is fixed to the first elastic element 4 by means of, for example, a vulcanizing process. The distance sleeve 12 is arranged to bear with a first end 13 against the vehicle cab 2 and with a second end 14 against a stop washer 15. The stop washer 15 has a diameter that is greater than the diameter of the through-hole 6 of the vehicle frame 3.

A fixing element 16 in the form of a threaded bolt 16 extends through a through-hole 17 in the vehicle cab 2, through the distance sleeve 12 and on through a through-hole 18 in the stop washer 15. A nut 19 is mounted on the threaded bolt 16 so that the stop washer 15 is pressed and fixed against the second end 14 of the distance sleeve 12. A second elastic element 20 is arranged on a surface of the stop washer 15, which surface faces towards the vehicle frame 3. The second elastic element 20 preferably comprises a more high-damping material with a higher damping factor than the first elastic element 4. As is shown in FIG. 1, the second elastic element 20 extends in an annular manner in a region at the periphery of the stop washer 15. A different geometry of the second elastic element 20 to that shown in FIG. 1 can nevertheless be selected.

The function of the stop washer 15, together with the second elastic element 20, is to damp powerful movements which tend to lift the cab 2 from the frame 3. The stop washer 15 may be slightly prestressed against the underside of the vehicle frame 3 or mounted with play between the second elastic element 20 and the underside or the frame 3 when the vehicle cab 2 is in a state of equilibrium. In order to achieve the desired play or the desired prestressing, shims 21 or distance washers can be arranged between the second end of the distance sleeve 12 and the stop washer 15.

According to the first embodiment, a third elastic element 22 is arranged on a surface of the flange 8, which surface faces towards the cab 2. The third elastic element 22 extends in an annular manner as far as the periphery of the flange 8 and preferably consists of the same material as the first elastic element 4. The third elastic element 22 functions as an impact damper so as to prevent cab movements with great amplitude. The third elastic element 22 is preferably arranged at a distance from the underside of the cab 2 when the cab 2 is partly or completely free of load. It is possible, however, for the first elastic element 4 to extend over that surface of the flange 8 that faces towards the cab 2.

According to a second embodiment shown in FIG. 4, a third elastic element 22 is arranged on a surface of the flange 8, which surface faces towards the cab 2. The distance between the third elastic element 22 and the underside of the cab 2 can be adjusted using shims 23 arranged between the third elastic element 22 and the flange 8. According to this embodiment, the third elastic element 22 is preferably made of a more high-damping material than the first elastic element 4. According to this embodiment, the second elastic element 20, which is arranged on the stop washer 15, consists of an annular disc and preferably has the same material properties as the third elastic element 22. A lock washer 24 may be arranged between the nut 19 and the stop washer 15.

When the vehicle 5 is travelling on a plane and level surface, the first elastic element will accordingly insulate and absorb the vibrations from the vehicle frame 3 that may cause noise and disturbing sound as well as irritating vibrations for the driver in the vehicle cab 2. This is achieved inter alia by virtue of the properties of the material and the geometry of the first elastic element 4 and also the fact that the vehicle cab 2 "floats" on the first elastic element 4. If, for example, the vehicle is travelling on a very uneven surface, the cab 2 begins to vibrate, and these vibrations are damped by the second elastic element 20 on the stop washer 15 and by the third elastic element 22 on the flange 8.

FIG. 5 shows a third embodiment of a fastening arrangement 1 according to the invention. According to this embodiment, the fastening arrangement 1 comprises a stop washer 15 with a second elastic element 20 which extends over and covers preferably the entire periphery of the stop washer 15. Alternatively, parts of the periphery of the stop washer 15 can be covered by the second elastic element 20. A tubular sleeve 35 is arranged on the underside of the vehicle frame 3. The tubular sleeve 35 may be circular or oval and has a length that preferably extends beyond the axial extent of the stop washer 15, seen from the vehicle frame 3. The tubular sleeve 35 has an inner diameter that is preferably greater than the combined outer diameter of the stop washer 15 and the second elastic element 20. The fastening arrangement 1 according to this third embodiment can, by means of the tubular sleeve 35 and the second elastic element 20, damp movements and impacts of the vehicle cab 2 in a plane that essentially coincides with the plane of the vehicle frame 3. In the event that the tubular sleeve 35 is oval, the stop washer 15 and/or the second elastic element 20 is/are also oval. See FIGS. 9 and 10 for example stop washer 15 shapes. The purpose of this is that it is then possible to obtain different damping characteristics in different horizontal directions.

FIGS. 6 and 7 show basic diagrams representing the properties of the fastening arrangements 1 according to the different embodiments. FIG. 6 shows the vertical displacement $S_V$ of the vehicle cab 2 as a function of the vertical force V acting on the fastening arrangement 1. The solid-line curve I represents the fastening arrangements 1 according to the second and third embodiment and the broken-line curve II represents the fastening arrangement according to the first embodiment. Curve II shows that the vertical displacement $S_V$ is relatively short which, from the point of view of driver comfort, is to be preferred in the event that the third elastic element 22 according to the first embodiment does not have high-damping properties.

FIG. 7 shows the horizontal displacement $S_H$ of the vehicle cab 2 as a function of the horizontal force H acting on the fastening arrangement 1. The solid-line curve III represents the fastening arrangement 1 according to the third embodiment and the broken-line curve IV represents the fastening arrangements according to the first and second embodiments.

According to a fourth embodiment shown in FIG. 8, an adjustment member 25 is coupled to the fastening arrangement 1. A piston 26 is arranged on the fixing element 16. The distance sleeve 12 is provided with an extension sleeve 27 and, together with the threaded bolt 16, forms a piston rod. The stop washer 15 bears against a first cylinder end wall 28 of a cylinder 29, in which inlet and outlet openings 30 for compressed air or hydraulic oil are arranged. A corresponding inlet and outlet opening 31 is arranged in a second cylinder end wall 32. When a fluid under pressure is fed in through the openings 30 in the first cylinder end wall 28, the fluid is supplied to a cylinder space 33 on a first side 34 of the piston 26. The pressure from the fluid then causes the stop washer 15 to move closer to the vehicle frame 3 so that the play between the second element 20 arranged on the stop washer 15 and the underside of the vehicle frame 3 is reduced or that the prestressing against the underside of the vehicle frame 3 is increased. When a fluid under pressure is fed in through the opening 31 in the second cylinder end wall 32, the situation is reversed. With the fastening arrangement 1 according to this fourth embodiment, controlled adjustment of the insulating and damping properties of the fastening arrangement 1 is achieved.

We claim:

1. A fastening arrangement for vibration-insulating and impact-damping fastening of a first member to a second member comprising:

a first elastic element arranged to bear against the first and the second members, said first elastic element comprising a first elastic element through-hole;

a fixing element arranged in through-holes of the first and second members and said first elastic element through-hole;

said first elastic element being arranged in and essentially contained in the through-hole of the second member;

a distance sleeve arranged in said first elastic element through-hole with said fixing element extending through said distance sleeve;

said distance sleeve being arranged to bear with a first end against said first member and with a second end against a stop washer provided with a stop washer through-hole which said fixing element extends;

a second elastic element provided on a surface of said stop washer that faces towards the second member; and a tubular sleeve arranged on a surface of the second member, which surface faces away from the first member, said tubular member surrounding said stop washer and extending beyond the axial extent of said stop washer as seen from the second member.

2. The fastening arrangement of claim 1, wherein said second elastic element is arranged on a periphery of said stop washer to damp movements and impact in a plane that essentially coincides with the second member.

3. The fastening arrangement of claim 1, wherein the stop washer is circular or oval.

4. The fastening arrangement of claim 1, wherein shims are arranged at the second end of the distance sleeve so as to adjust the distance of the stop washer from the second member.

5. The fastening arrangement of claim 1, wherein a ring made of a rigid material is arranged on a peripheral surface of the first elastic element.

6. The fastening arrangement of claim 5, wherein the ring comprises a flange which is arranged to bear against the second member.

7. The fastening arrangement of claim 6, wherein the first elastic element is arranged on a surface of the flange, which surface faces towards the first member.

8. The fastening arrangement of claim 6, further comprising a third elastic element arranged on a surface of the flange, which surface faces towards the first member.

9. The fastening arrangement of claim 8, wherein the shims are arranged between the surface of the flange and the third elastic element so as to adjust the distance between the first member and the third elastic element.

10. The fastening arrangement of claim 1, wherein the first elastic element consists of rubber.

11. The fastening arrangement of claim 1, wherein the second elastic element consists of a material with a higher damping factor than the material of the first elastic element.

12. The fastening arrangement of claim 8, wherein the third elastic element consists of a material with a higher damping factor than the material of the first elastic element.

13. The fastening arrangement of claim 1, further comprising an adjustment member in the form of a piston arranged in a cylinder, which piston is mounted on the fixing element, allowing adjustment of the vibration-insulating and impact-damping properties of the fastening arrangement.

14. The fastening arrangement of claim 1, wherein the first member comprises a vehicle cab and the second member comprises a vehicle frame.

\* \* \* \* \*